Figure 1:
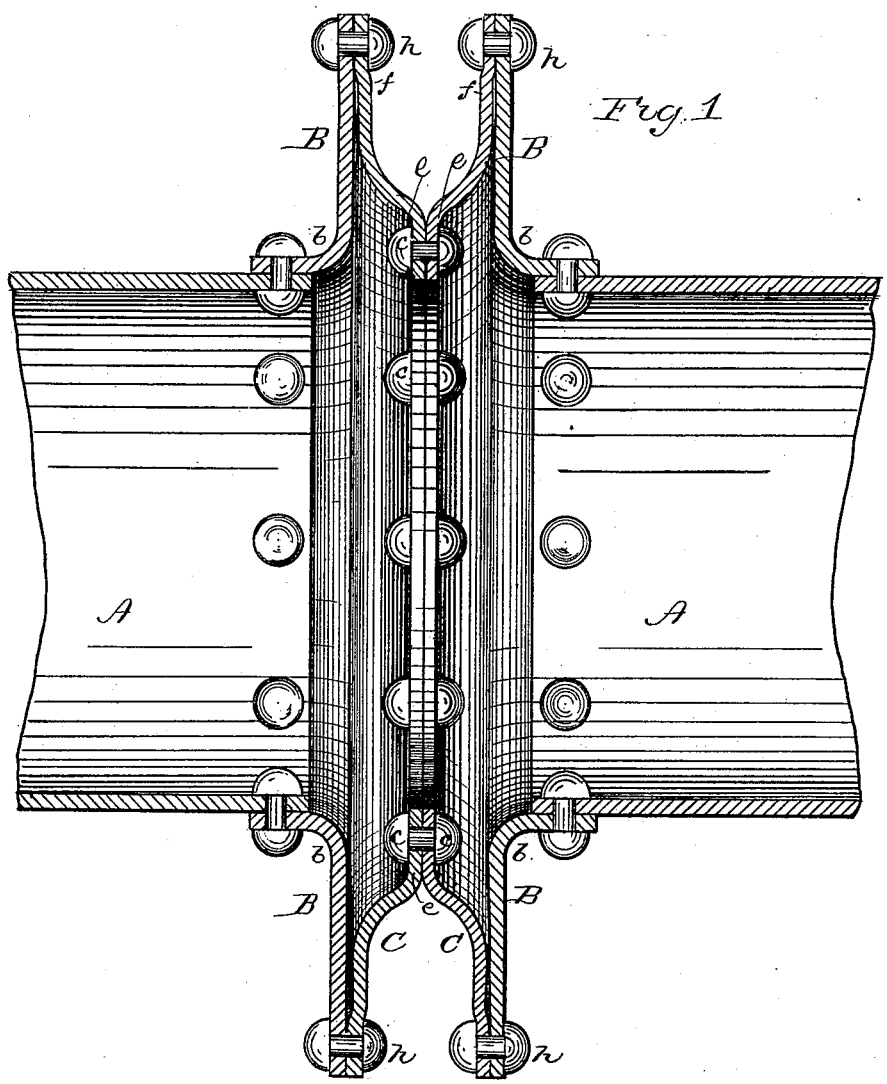

(No Model.) 2 Sheets—Sheet 1.

J. HEMPHILL.
EXPANDING JOINT FOR TUBES.

No. 337,580. Patented Mar. 9, 1886.

Witnesses.
N. A. Connolly
Daniel Scott

Inventor,
James Hemphill,
By Connolly Bro.,
Attys.

UNITED STATES PATENT OFFICE.

JAMES HEMPHILL, OF PITTSBURG, PENNSYLVANIA.

EXPANDING JOINT FOR TUBES.

SPECIFICATION forming part of Letters Patent No. 337,580, dated March 9, 1886.

Application filed December 28, 1885. Serial No. 186,907. (No model.)

*To all whom it may concern:*

Be it known that I, JAMES HEMPHILL, a citizen of the United States, residing at Pittsburg, in the county of Allegheny and State of Pennsylvania, have invented certain new and useful Improvements in Expanding Joints or Connections for Tubes and Conduits for Natural Gas, &c.; and I do hereby declare the following to be a full, clear, and exact description of the invention, reference being had to the accompanying drawings, which form part of this specification.

The object of my invention is to provide for the expansion and contraction of metallic tubing, and more particularly that class of wrought-iron tubing employed for the conveyance of gas or other fluids under pressure, and which are subject to degrees of expansion and contraction that the joints or couplings now in use will not adequately compensate for or bear without injury.

My invention consists in the novel construction of an expansible coupling or connection which will permit of all degrees of expansion and contraction in the pipes or tubes to which it is applied, and which will be unaffected in permanency and unimpaired in efficiency by any of the variations to which it may be subjected.

My invention contemplates, as a coupling for pipes, the use of a series or set of elastic metal disks, so riveted to the tubing and together that they will freely yield and bend under the strain imposed by the expansion or contraction of the pipes, and as freely resume their normal positions without in any manner impairing or injuring the structure of the metal constituting the coupling.

I am aware that it has been proposed to couple steam-pipes by a device called a "variator," consisting of a series of thin metallic plates connected at their outer edges by means of heavy rings, to which the plates are riveted.

In this form of expansion-coupling the elastic disks are arranged in parallel series, and for this reason, as well as on account of their peculiar arrangement with reference to the interposed rings and their relation to the sections of tubing, the tendency of any expansion or contraction is to stretch the metal disks and plates at their edges, and thus not only strain and injure the structure of the metal, but loosen the rivets and in this way destroy the efficiency of the coupling. The same result would follow the use, in any similar expansible coupling or joint, of plates arranged in parallel series, and to a greater or less degree in any coupling in which the plates between the tube-collars were arranged on true or even planes, although converged toward each other at their inner edges.

In applying the elastic disks I depart from the plans heretofore suggested, and instead of arranging the expanding disks parallel to each other or converging on even planes toward their inner edges, I curve the elastic disks inwardly, whereby their elastic properties will be fully effective, and the strain due to expansion and contraction brought to bear on the curved and spring-like portions. Under such conditions I prevent, absolutely, any stretching of the metal at the edges or near the rivets, and hence obtain an expansible joint which will bear any amount of pressure or tension without becoming in the least degree leaky or inefficient.

Figure 2:
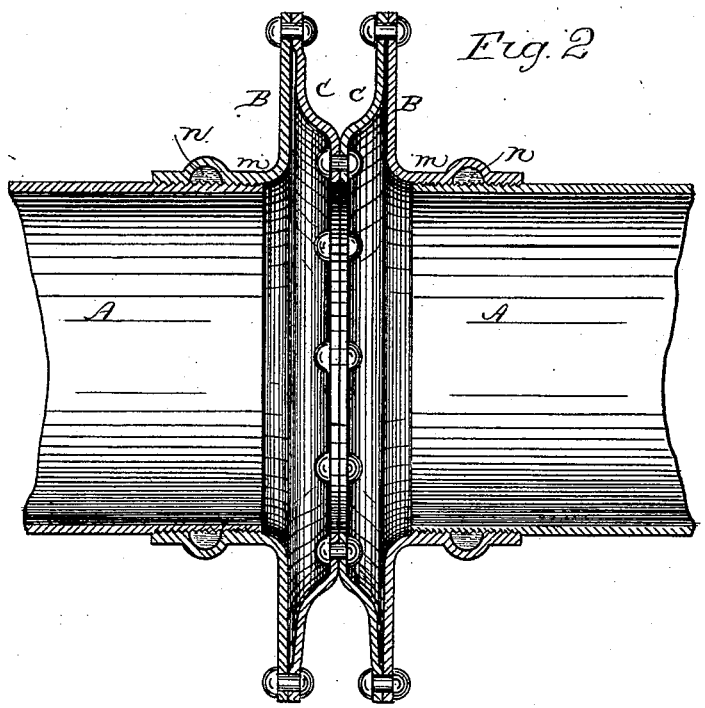

In the accompanying drawings, in which Figure 1 represents a central longitudinal section of a wrought-iron tube coupled according to my invention, and Fig. 2 a similar section of a modification, A A designate two sections of tubing of any suitable diameter and thickness of stock. To the ends of these sections I strongly rivet the flanged disks B B, which, being bent at *b b*, thence flare or spread outwardly on planes at right angles with the axis of the tube. Between these flanged disks, which are of about the same thickness of metal as the tubes, I arrange the expanding disks C C, which I make of lighter or somewhat thinner stock, so as to increase the elasticity of the joint.

The form of the disks C C is, in cross-section through any part, that of an ogee curve from the inner flanges, *e*, to the outer flattened or flaring portions, *f f*. At their inner edges the disks C C are secured together by rivets *c c*, and at their outer edges they are secured by rivets *h h* to the disks B B.

In constructing and applying the joint to the pipes most of the work is done at the factory or shop. The tubes may be completed in lengths of, say, sixty feet, with all the intermediate expanding joints fitted and riveted. One extremity of the completed section will then have attached to it a disk, B, and the two curved disks C C, while the other end of the section will carry only the disk B; hence in laying the pipes all that is required on the ground or in the trench is to rivet one of the disks C to the disk B on the next adjoining section. The work done at the shop will necessarily be carefully performed, and perfectly close and secure joints will be obtained, while in laying the pipes the small amount of work to be done will insure its being accomplished with care and in keeping with the work of the shop.

The joint constructed as described will expand and contract to any required extent, and will perform its functions under all conditions, repeatedly expanding and contracting without in the least degree becoming loose, open, or weak.

The joint possesses sufficient strength to withstand any internal pressure to which it is likely to be subjected, and, unlike other expanding joints, to which reference has been already made, does not require any sleeves, internal bands, or other appliances to increase its strength.

I have described the disks B B as being riveted to the sections A A; but such riveting is not necessary, and I do not, therefore, limit myself to such means of attachment. In Fig. 2 I have shown the flanges of the disks B B extended so as to form collars or sockets m m, which are screw-threaded internally for the reception of the correspondingly-threaded ends of the tube-sections, and this method of attachment I consider fully within the spirit of my invention. If desired, the extended portions m m may be formed within internal annular recesses, n n, for the reception of any sealing medium or material to be employed in rendering the joints hermetically tight.

The disks B B, while shown and described as being arranged at right angles to the axis of the tube, are not necessarily of such shape, but may be dished or bent obliquely.

Having now described my invention, what I claim, and desire to secure by Letters Patent, is—

1. The expanding pipe joint or coupling herein described, composed of the flanged disks B B, connected to the pipes A A, and the inwardly-curved and converging disks C C, riveted together at their inner edges, and at their outer edges riveted to the disks B B, substantially as described.

2. The combination, with the pipe-sections A A, having riveted or otherwise attached thereto the annular disks B B, of the curved and converging expanding disks C C, riveted together at their inner edges, and at their outer edges riveted to the disks B B, substantially as described.

3. An expansible coupling or connection for pipes, tubes, or conduits, consisting of flanged annular disks riveted or otherwise attached to the ends of the pipes, tubes, or conduits, and the interposed elastic disks or expanding plates of curvilinear form, riveted together and to the flanged disks, substantially as described.

4. The expansible coupling or connection for pipes, tubes, or conduits, consisting of the disks B B, having flanges, collars, or sockets for the reception of the ends of the pipes, tubes, or conduits, and the interposed elastic disks C C, of curvilinear form, converging toward their inner edges and riveted together and to the disks B B, substantially as described.

In testimony that I claim the foregoing I have hereunto set my hand this 23d day of December, 1885.

JAMES HEMPHILL.

Witnesses:
C. L. STRAUB,
THOS. A. CONNOLLY.